Figure 4:
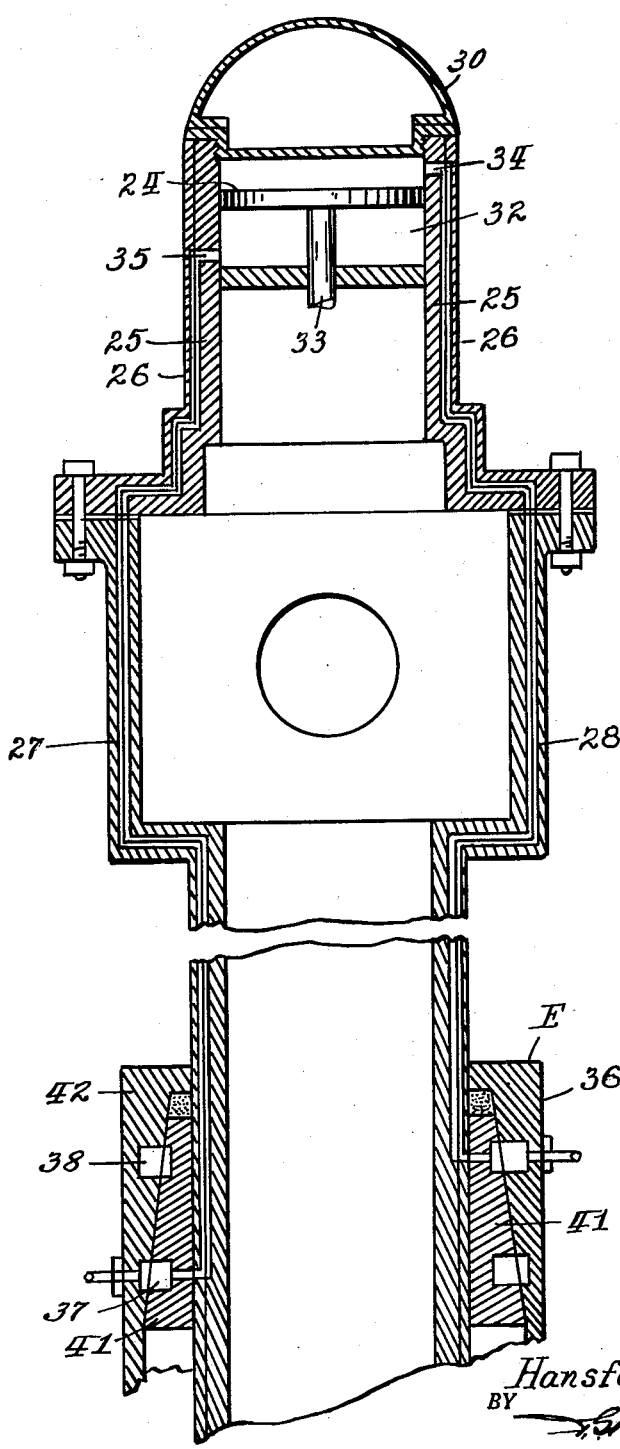

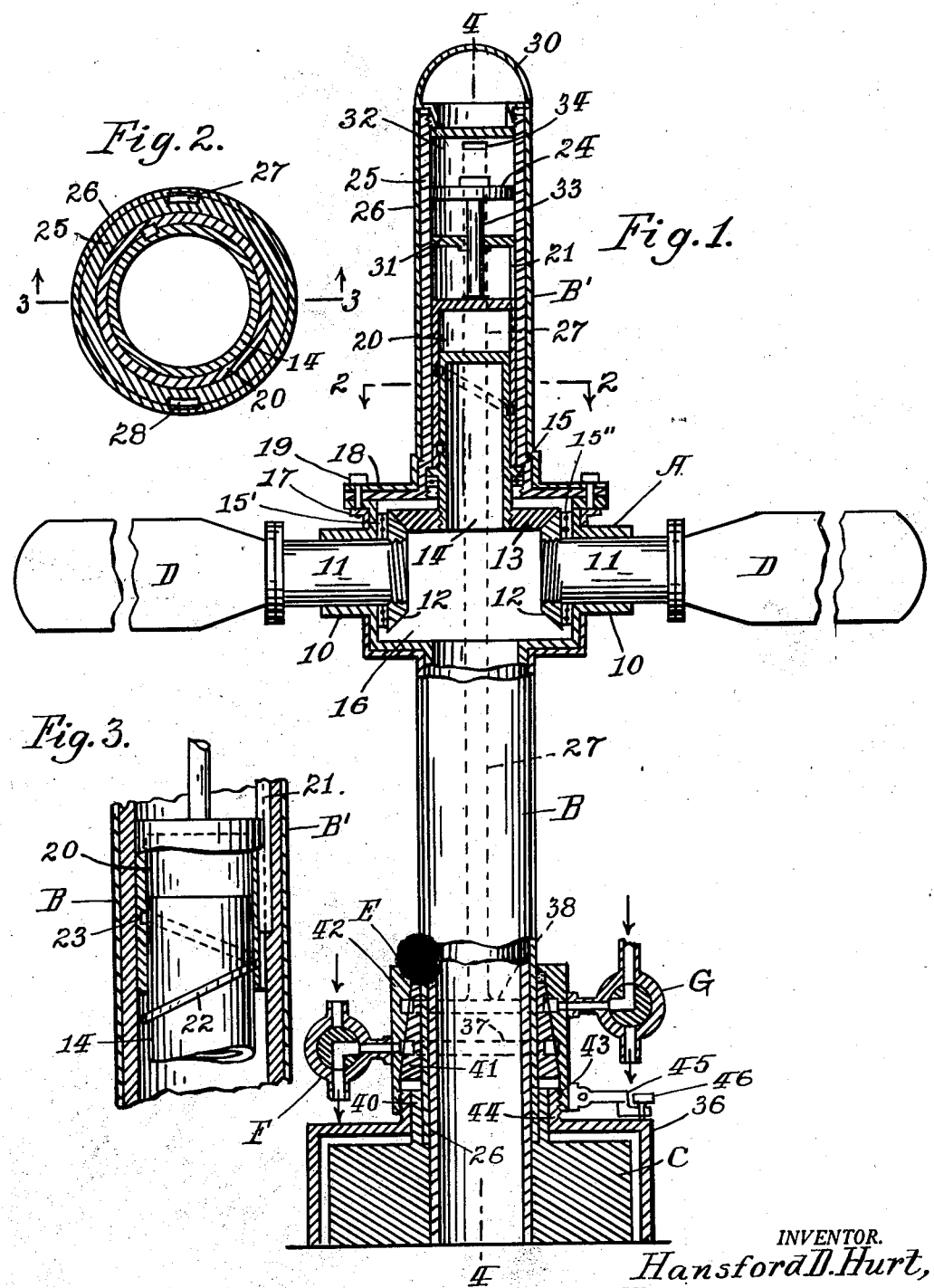

Patented Apr. 21, 1953

2,635,701

UNITED STATES PATENT OFFICE 2,635,701

FLUID CONTROLLED FEATHERING MEANS FOR PROPELLERS FOR AIRCRAFT

Hansford D. Hurt, Arlington, Calif.

Application March 13, 1950, Serial No. 149,419

3 Claims. (Cl. 170—160.32)

This invention relates to improvements in fluid controlled variable pitch propellers for aircraft. An object of this invention is to provide a simplified and highly effective built in fluid conducting system for regulating the pitch and controlling the operation of propeller blades on aircraft while the blades are either revolving or at rest. Another object is to provide improved fluid control means which enables the propeller blades to be controlled from a convenient location remote therefrom. Another object is to provide a compact built in fluid control system which forms an integral part of the assembled propeller operating structure and which is self contained and not liable to get out of running order or leak. Among further objects is to provide a simplified and effective propeller head structure. These and other objects will be fully set forth by the following specification of which the drawings form a part.

This application provides simplified construction and various improvements over that disclosed in my previous Patent No. 2,456,510, granted December 14, 1948, and is a continuation in part of my companion application Serial No. 48,022, filed September 7, 1948, now abandoned, to which reference is made.

In the drawings, Fig. 1 is a vertical central section showing a portion of my improved fluid controlled propellers which are adapted for use on aircraft; Fig. 2 is a cross section at enlarged scale, taken on the line 2—2 of Fig. 1, showing the manner of secluding the pressure fluid conducting passages for operating and regulating the pitch of the propeller blades in the walls of the supporting propeller shaft; Fig. 3 is a vertical section taken on line 3—3 of Fig. 2, showing a portion of the means by which the pitch of the propeller blades is controlled, and Fig. 4 is a central vertical section at enlarged scale taken partially on the line 4—4 of Fig. 1 and showing diagrammatically the manner in which the controlling ducts extend longitudinally and are concealed or incorporated into the structure.

In the drawings, A represents a T head which resembles an integral housing on the upper portion of the tubular vertical drive shaft B for operating the propeller blades D—D. The shaft is stepped axially in the upwardly extending rotary drive element C and is driven to rotate the laterally disposed propeller blades D—D about the axis of the shaft. The T head is formed by a housing 16 which has a pair of hollow cylindrical horizontal journal bearings 10—10, resembling laterally extending arms in which the shanks 11—11 of the propeller blades D—D are swiveled horizontally on opposite sides of the shaft structure so as to permit feathering.

Each of said shanks has a bevel toothed pinion 12, rigidly secured on its inner end within the T head housing. The teeth of said pinion mesh with the teeth of a horizontal bevel drive gear 13. The drive gear 13 is fixed on the lower end portion of a vertical stub shaft 14 which is journaled in a horizontal antifriction bearing 15, said bearing being seated in the lower end portion of the upwardly extended section B', of shaft B, above the T head. The T head thus functions as a housing for the gears 12 and 13 to protect them. The housing has a horizontal flange 17 on its upper end to which the corresponding flanged lower end portion 18 on the upper shaft section B' is rigidly secured by bolts 19 or other suitable means, to support the upper shaft section in erect position.

The lower and upper walls of shaft sections B—B' are of dual tubular construction so as to conceal suitable ducts 27 and 28 for conducting pressurized fluid to and from the pitch changing means of the propeller blades which are operatively supported in the T arms 10—10 of the T head A. This dual construction of the walls is for the purpose of providing suitable fluid ducts 27 and 28 (Figs. 2 and 4), within the walls of each of the shaft members B—B', so as to prevent leaking or damage.

The feathering inclination of the propeller blades D—D is regulated by swivel movement which is imparted to the stub shaft 14 by the non-rotatable sleeve 20, the latter being splined at 21 (Fig. 3), to the inner wall of the tubular shaft section B' so as to permit longitudinal travel but prevent rotation. The stub shaft 14 carries a helical male thread 22 on its perimeter which meshes with a helical groove 23 in the inner cylindrical wall of the sleeve 20. In this manner reciprocating driving motion of member 20 is converted into rotary motion of the stub shaft 14 and propeller blades D—D. The sleeve 20 is reciprocated longitudinally by the piston 24 as hereinafter described.

The upper end portion of the shaft section B' is closed by the cap 30, and together with an inner transverse wall 31, which is fixed across the inner wall of the shaft member B' and spaced from said cap, provides the operating cylindrical chamber 32 in which the piston 24 is free to reciprocate, said piston in turn being connected to the actuating sleeve 20 by the piston rod 33. The duct 27 (Fig. 2) is connected with chamber 32 by the port passage 34 on one side of piston 24, and duct 28 (Fig. 2) is connected with said chamber on the opposite side of piston 24 by port passage 35 (Fig. 4). These concealed passages lead downwardly through the wall sections of the tubular shaft on opposite sides thereof so as to be controlled in operation by the stationary self contained, sealed in and adjustable coupling E above the stationary casing 36 in which the drive body C is revolubly held.

It is intended that the various rotative members in the device are provided with anti-friction means such as the bearing elements 15, 15' and 15", which are commonly employed between rotative surfaces, within the spirit of the invention and good mechanical practice.

In Fig. 4, I have illustrated schematically the manner in which the ducts 27 and 28 are applied in the dual wall construction shown in Fig. 1, said ducts being connected between the opposite ends of cylinder 32 and the valve E for regulating the pitch of propellers D—D. Cooperating with these ducts my improvement provides novel control means by which operating pressure is directed to and from the cylindrical chamber 32 in which the operating piston is driven forwardly or backwardly to regulate the feathering angle assumed by the propeller blades, said control means being regulated while the drive shaft is at rest or revolving. The shaft is revolved by the driving body C in which the lower end portion of members 25 and 26 are rigidly socketed. The drive shaft C is journaled in the neck 40 of the stationary supporting casing 36. An upwardly tapering annular coupling core 41 is rigidly secured in fixed position on the lower end of the shaft body C and revolves with shaft B. An annular companion coupling cap member 42 is closely fitted in revoluble connection encircling said core, being threadedly connected at 43 in adjusted position on an annular collar 44, which latter is formed on the stationary casing 36. A pair of annular conducting passages 37 and 38 are provided between said core and the cap member, one being connected with duct 27 and the other connected with duct 28 (Fig. 2). The control coupling E is held in adjusted fluid tight connection on the tapered core 41 by the arm 45 and a set screw 46, which latter is adapted to engage the stationary casing 36 and hold the controling cap coupling 42 adjusted.

The valves F and G are adapted to make connection of operating pressure fluid with the opposite end portions of the cylindrical chamber 32 while the drive shaft is either revolving or at rest to regulate the feathering angle of the propeller blades. Threeway valves F and G are shown connected with the annular conducting passages by which operating pressure fluid in one position of said valves is adapted to be admitted and exhausted from opposite ends of cylinder 32 to feather the propeller blades in one direction or when reversed to return the propeller blades to normal position.

The improved structure above described is simple and effective in operation and is not liable to get out of running order. By concealing the ducts in the manner described in the wall of the revoluble shaft danger from injury is obviated and the apparatus is simplified. The control system described by which the propeller blades are feathered is simple and highly effective. Also the control by which feathering of the blades is regulated from a remote distance while the blades are at rest or operating is self-contained in the operating structure enables the apparatus to be more easily manipulated by an operator by the use of compressed fluid.

In accordance with the patent statutes I have described my invention both as to structure and operation, but I desire to have it understood that the structure shown is only illustrative and that the invention as shown and described may be modified within the spirit of the invention and the scope of the following claims.

I claim:

1. In a structure having a pair of upwardly extending inner and outer cylindrical members closely fitted and secured together and forming a standard having longitudinal fluid transmitting ducts between the adjacent surfaces of said cylindrical members, laterally extending propeller blades swiveled upon said pair of cylindrical members, fluid actuated feathering means connected between the propeller blades and said fluid transmitting ducts, a driving support for revolving said standard, and valve controlling means coupled with each of said ducts to apply actuating medium for simultaneously feathering both of said propelling blades.

2. In a structure having a pair of upwardly extending inner and outer tubular members shrunk tightly together and forming a standard having a plurality of longitudinal fluid transmitting ducts between the inner adjacent surfaces of said cylindrical members, laterally extending propeller blades swiveled upon said pair of tubular members, fluid actuated feathering means connected between the propeller blades and said fluid transmitting ducts, a driving support for revolving said standard, each of said ducts having a valve control governing the feathering angularity assumed by a companion propeller blade.

3. In a structure having a pair of upwardly extending inner and outer tubular members fitted tightly together and forming a standard having longitudinal fluid transmitting ducts between its pair of inner adjacent surfaces, transverse propeller blades swiveled horizontally upon said pair of tubular standard members, fluid propelled feathering means connected between each of said propeller blades and a companion fluid transmitting duct, a driving support on and by which said standard is connected and revolved, and a valved coupling connected with said ducts for controlling the application of actuating fluid to the feathering control for each of said propeller blades.

HANSFORD D. HURT.

References Cited in the file of this patent

UNITED STATES PATENTS

| Number | Name | Date |
|---|---|---|
| 2,343,416 | Keller | Mar. 7, 1944 |
| 2,373,385 | Davie, Jr. | Apr. 10, 1945 |
| 2,402,065 | Martin | June 11, 1946 |
| 2,413,439 | Drake | Dec. 31, 1946 |
| 2,456,510 | Hurt | Dec. 14, 1948 |